US012125303B2

(12) United States Patent
Xie et al.

(10) Patent No.: US 12,125,303 B2
(45) Date of Patent: Oct. 22, 2024

(54) TEXT RECOGNITION METHOD AND TERMINAL DEVICE

(71) Applicant: Huawei Technologies Co., Ltd., Shenzhen (CN)

(72) Inventors: Miao Xie, Shenzhen (CN); Liehang Shi, Shanghai (CN); Hengzhi Yao, Shenzhen (CN); Junwei Gou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 534 days.

(21) Appl. No.: 17/361,746

(22) Filed: Jun. 29, 2021

(65) Prior Publication Data
US 2021/0326655 A1    Oct. 21, 2021

Related U.S. Application Data

(63) Continuation of application No. PCT/CN2018/125715, filed on Dec. 29, 2018.

(51) Int. Cl.
*G06F 18/21* (2023.01)
*G06F 18/2431* (2023.01)
(Continued)

(52) U.S. Cl.
CPC ...... *G06V 30/1478* (2022.01); *G06F 18/2163* (2023.01); *G06F 18/2431* (2023.01);
(Continued)

(58) Field of Classification Search
CPC ............. G06V 30/1478; G06V 30/166; G06V 30/18105; G06V 30/10; G06F 18/2163; G06F 18/2431; G06N 3/08
See application file for complete search history.

(56) References Cited

U.S. PATENT DOCUMENTS

| 2003/0086615 A1 | 5/2003 | Dance et al. |
| 2014/0050367 A1* | 2/2014 | Chen ..................... G06V 10/987 382/112 |
| 2019/0266445 A1* | 8/2019 | Chen ..................... G06V 20/62 |

FOREIGN PATENT DOCUMENTS

| CN | 103295008 A | 9/2013 |
| CN | 105139042 A | 12/2015 |
| CN | 105678301 A | 6/2016 |

OTHER PUBLICATIONS

Max Jaderberg, Reading Text in the Wild with Convolutional Neural Networks (Year: 2014).*
(Continued)

*Primary Examiner* — Marcos L Torres
(74) *Attorney, Agent, or Firm* — Conley Rose, P.C.

(57) ABSTRACT

A text recognition method includes scaling a to-be-recognized image based on a first scale ratio, determining first coordinate information corresponding to a text line area in the scaled to-be-recognized image, determining, based on the first scale ratio, second coordinate information corresponding to the first coordinate information, where the second coordinate information is coordinate information of the text line area in the to-be-recognized image, performing character recognition on text line images corresponding to the second coordinate information by using a recognition model, and determining text line content corresponding to the text line images, where the to-be-recognized image includes the text line images.

20 Claims, 6 Drawing Sheets

(51) Int. Cl.
*G06N 3/08* (2023.01)
*G06V 30/146* (2022.01)
*G06V 30/166* (2022.01)
*G06V 30/18* (2022.01)
*G06V 30/10* (2022.01)

(52) U.S. Cl.
CPC ............. *G06N 3/08* (2013.01); *G06V 30/166* (2022.01); *G06V 30/18105* (2022.01); *G06V 30/10* (2022.01)

(56) References Cited

OTHER PUBLICATIONS

He, W., "Deep Direct Regression for Multi-Oriented Scene Text Detection," (CVPR 2017), Mar. 24, 2017, 9 pages.
Tian, Z., "Detecting Text in Natural Image with Connectionist Text Proposal Network," Sep. 12, 2016, 16 pages.
Yin, F., et al., "Scene Text Recognition with Sliding Convolutional Character Models," Sep. 6, 2017, 10 pages.
Zhu, A., et al., "Scene Text Relocation with Guidance," 14th IAPR International Conference on Document Analysis and Recognition (ICDAR), IEEE, vol. 1, Nov. 9, 2017, 6 pages.
Jaderberg, M., "Reading Text in the Wild with Convolutional Neural Networks," International Journal of Computer Vision, Kluwer Academic Publishers, Norwell, US, vol. 116, No. 1, May 7, 2015, 20 pages.
Yin, F., et al., "Scene Text Recognition with Sliding Convolutional Character Models," arxiv.org, Cornell University Library, 201 Olin Library Cornell University Ithaca, NY14853, Sep. 6, 2017, 10 pages.

* cited by examiner

TEXT RECOGNITION METHOD AND TERMINAL DEVICE

CROSS-REFERENCE TO RELATED APPLICATIONS

This is a continuation of International Patent Application No. PCT/CN2018/125715 filed on Dec. 29, 2018, which is hereby incorporated by reference in its entirety.

TECHNICAL FIELD

This application relates to the artificial intelligence (AI) field, and in particular, to a text recognition method and a terminal device.

BACKGROUND

Currently, as mobile terminals develop rapidly, many manufacturers publicize AI phones. Because of features of convenient collection, friendly interaction, rich information, device-end computability, high application efficiency, and the like in visual-related fields, the visual-related fields become a key point of AI technologies for the mobile terminals. However, optical character recognition (OCR) becomes a difficult point and a high light in visual processing due to features of diverse characters, complex scenarios, and rich semantic information.

In some text recognition solutions, a sliding window technology (referred to as a sliding window below) is used on an input image to partition the raw image into a plurality of sub-images in a manner allowing overlapping areas. Then the plurality of partitioned sub-images are sent to a neural network for detection. However, because each of the plurality of sub-images obtained by using the sliding window to partition the raw image needs to invoke a model, the model needs to be invoked for a plurality of times. Consequently, large calculation overheads are required in image processing. In addition, because the plurality of sub-images has overlapping areas, serious resource waste is caused. Because the raw image is partitioned into the plurality of sub-images, an extra merge operation needs to be finally performed. On the whole, the solutions cause serious resource waste and consumption. For text recognition on a high-quality image, the problem of resource waste and consumption becomes more obvious.

In some other solutions, a sliding window is also used to perform sliding selection on a text line image. A sliding step of 4 or 8 is set based on different Chinese and English characters. In a sliding process, the sliding window fills an edge of the image, so that an edge context is not omitted. Then, the text line image is sent to a neural network for recognition. Because the step is set to 4 or 8, when the text line image is sent to the neural network for the recognition and calculation, 4 or 8 times of repeated calculation is caused. As a result, resource waste is caused. When a raw image layer is truncated by using the sliding window, all images that are partitioned by using the sliding window and that are in one image are spliced, and then losses (loss) of an input sequence and a sample ground truth (gt) sequence are calculated based on sequence classification (CTC) of the neural network. In this case, utility of the CTC is not truly realized. In addition, when one image is processed, because a sliding window operation needs to be performed on each text line, but a neural network calculation unit (NPU) can process only one line of text at a time, a parallel capability between text lines is poor. Therefore, the NPU needs to be invoked for a plurality of times for processing.

In some text recognition solutions, image partition performed by using a sliding window results in serious resource waste and extra calculation overheads. In addition, an NPU needs to be invoked for a plurality of times. Consequently, a text recognition response time is excessively long, and an experience effect is severely affected.

SUMMARY

Embodiments of this application provide a text recognition method and a terminal device. A raw image is scaled. Coordinates of text lines are found in the image, and restored to the raw image. Corresponding text line images are found in the raw image and are sent to a recognition model for character recognition. This avoids resource waste caused by invoking an NPU for a plurality of times in sub-images obtained through partitioning by using a sliding window. Based on actual requirements for low response delay and low power consumption of a mobile terminal application and NPU technical specifications, an advantage of a device-end AI dedicated chip can be fully utilized to concurrently process a plurality of text lines at a time. Therefore, NPU usage and user experience of an OCR product are improved.

According to a first aspect, an embodiment of this application provides a text recognition method. The method includes: scaling a to-be-recognized image based on a first scale ratio; determining first coordinate information corresponding to a text line area in the scaled to-be-recognized image; determining, based on the first scale ratio, second coordinate information corresponding to the first coordinate information, where the second coordinate information is coordinate information of the text line area in the to-be-recognized image; and performing character recognition on text line images corresponding to the second coordinate information by using a recognition model, and determining text line content corresponding to the text line images, where the to-be-recognized image includes the text line images.

In a possible implementation, the to-be-recognized image includes at least one text line area, and the determining first coordinate information corresponding to a text line area in the scaled to-be-recognized image includes: performing, by using a neural network, text area detection on the scaled to-be-recognized image, to obtain a confidence of at least one candidate area, where the confidence is a value of a probability that the at least one candidate area includes a text line; and deleting at least one candidate area whose confidence is less than a first confidence threshold, sorting confidences of at least one remaining candidate area to select the candidate area with the highest confidence, combining the selected candidate area and an unselected candidate area, sorting confidences of the uncombined at least one candidate area to select the candidate area with the highest confidence, combining the selected candidate area and an unselected candidate area, and determining the first coordinate information corresponding to at least one combined text line area until all candidate areas are combined.

In a possible implementation, the combining the selected candidate area and an unselected candidate area includes: when a ratio of overlapping areas between the unselected candidate area and the selected candidate area is greater than or equal to a first area ratio threshold, deleting, by using a non-maximum suppression algorithm, a candidate area with a low confidence, in the two candidate areas; and when the unselected candidate area and the selected candidate area are adjacent in a long side direction or a ratio of overlapping areas between the unselected candidate area and the selected candidate area in a long side direction is less than the first area ratio threshold, merging the unselected candidate area and the selected candidate area into one area.

In a possible implementation, before the step of recognizing text line images corresponding to the second coordinate information by using a recognition model, the method further includes: obtaining, from the to-be-recognized image, the text line images corresponding to the second coordinate information; performing grayscale processing on the text line images; and sending the gray-scaled text line images to the recognition model for the character recognition.

In a possible implementation, before the character recognition is performed on the gray-scaled text line images by using the recognition model, the method further includes: classifying the gray-scaled text line images into three types: horizontal direction, vertical direction, and non-horizontal and non-vertical direction; performing affine transformation on a text line image in the non-horizontal and non-vertical direction, so that all text line images are in the horizontal direction or the vertical direction; and traversing all text line images in the vertical direction, splitting each text line image in the vertical direction into a plurality of text line images in the horizontal direction, and performing labeling.

In a possible implementation, the splitting each text line image in the vertical direction into a plurality of text line images in the horizontal direction, and performing labeling includes: in a horizontal labeling manner, splitting each text line image in the vertical direction into the plurality of single-character text line images in the horizontal direction and performing the labeling.

In a possible implementation, the performing character recognition on text line images corresponding to the second coordinate information by using a recognition model further includes: scaling, based on a second scale ratio, the text line images corresponding to the second coordinate information, and performing the character recognition on the scaled text line images.

In a possible implementation, manners for scaling the text line images to a second pixel ratio include: proportional scaling, equal width scaling, equal length scaling, tile scaling, and zero filling scaling.

In a possible implementation, the recognition model is further configured to recognize a space character.

In a possible implementation, an operator in the recognition model does not include a sliding window and a recurrent neural network operator layer that are outside a convolution operation.

According to a second aspect, an embodiment of this application provides a text recognition method including: obtaining a plurality of pieces of text line data; labeling a space character in the plurality of pieces of text line data by using a preset label; and updating a recognition model based on the labeled text line data. The updated recognition model is further configured to recognize the space character.

According to a third aspect, an embodiment of this application provides a terminal device. The terminal device includes a processor, a detector, and a character recognizer. The processor is configured to scale a to-be-recognized image based on a first scale ratio. The detector is configured to determine first coordinate information corresponding to a text line area in the scaled to-be-recognized image, and determine, based on the first scale ratio, second coordinate information corresponding to the first coordinate information. The second coordinate information is coordinate information of the text line area in the to-be-recognized image.

The character recognizer is configured to perform character recognition on text line images corresponding to the second coordinate information by using a recognition model, and determine text line content corresponding to the text line images. The to-be-recognized image includes the text line images.

In a possible implementation, the to-be-recognized image includes at least one text line area, and the detector is further configured to: perform, by using a neural network, text area detection on the scaled to-be-recognized image, to obtain a confidence of at least one candidate area, where the confidence is a value of a probability that the at least one candidate area includes a text line; and delete at least one candidate area whose confidence is less than a first confidence threshold, sort confidences of at least one remaining candidate area to select the candidate area with the highest confidence, combine the selected candidate area and an unselected candidate area, sort confidences of the uncombined at least one candidate area to select the candidate area with the highest confidence, combine the selected candidate area and an unselected candidate area, and determine the first coordinate information corresponding to at least one combined text line area until all candidate areas are combined.

In a possible implementation, that the selected candidate area and the unselected candidate area are combined includes: when a ratio of overlapping areas between the unselected candidate area and the selected candidate area is greater than or equal to a first area ratio threshold, a candidate area with a low confidence, in the two candidate areas is deleted by using a non-maximum suppression algorithm; and when the unselected candidate area and the selected candidate area are adjacent in a long side direction or a ratio of overlapping areas between the unselected candidate area and the selected candidate area in a long side direction is less than the first area ratio threshold, the unselected candidate area and the selected candidate area are merged into one area.

In a possible implementation, the detector is further configured to: obtain, from the to-be-recognized image, the text line images corresponding to the second coordinate information; perform grayscale processing on the text line images; and send the gray-scaled text line images to the character recognizer for the character recognition.

In a possible implementation, before the character recognition is performed on the gray-scaled text line images by using the recognition model, the detector is further configured to: classify the gray-scaled text line images into three types: horizontal direction, vertical direction, and non-horizontal and non-vertical direction; perform affine transformation on a text line image in the non-horizontal and non-vertical direction, so that all text line images are in the horizontal direction or the vertical direction; and traverse all text line images in the vertical direction, split each text line image in the vertical direction into a plurality of text line images in the horizontal direction, and perform labeling.

In a possible implementation, that each text line image in the vertical direction is split into the plurality of text line images in the horizontal direction, and the labeling is performed includes: in a horizontal labeling manner, each text line image in the vertical direction is split into the plurality of single-character text line images in the horizontal direction and the labeling is performed.

In a possible implementation, the detector is further configured to scale, based on a second scale ratio, the text line images corresponding to the second coordinate information, and perform the character recognition on the scaled text line images.

In a possible implementation, manners for scaling the text line images to a second pixel ratio include: proportional scaling, equal width scaling, equal length scaling, tile scaling, and zero filling scaling.

In a possible implementation, the recognition model is further configured to recognize a space character.

In a possible implementation, an operator in the recognition model does not include a sliding window and a recurrent neural network operator layer that are outside a convolution operation.

According to a fourth aspect, an embodiment of this application provides a terminal device including a convolutional network model trainer. The convolutional network model trainer is configured to: obtain a plurality of pieces of text line data, label a space character in the plurality of pieces of text line data by using a preset label, and update a recognition model based on the labeled text line data. The updated recognition model is further configured to recognize the space character.

According to a fifth aspect, an embodiment of this application provides a computer-readable storage medium including an instruction. When the instruction is run on a computer, the computer is enabled to perform the method according to any one of the possible implementations of the first aspect.

According to a sixth aspect, an embodiment of this application provides a computer-readable storage medium including an instruction. When the instruction is run on a computer, the computer is enabled to perform the method according to any one of the possible implementations of the second aspect.

According to a seventh aspect, an embodiment of this application provides a computer program product including an instruction. When the computer program product runs on a computer, the computer is enabled to perform the method according to any one of the possible implementations of the first aspect.

According to an eighth aspect, an embodiment of this application provides a computer program product including an instruction. When the computer program product runs on a computer, the computer is enabled to perform the method according to any one of the possible implementations of the second aspect.

According to the text recognition method and the terminal device provided in the embodiments of this application, in text area detection, an input image is scaled to a specific pixel ratio and sent to a text area model for detection. In the solutions of this application, the NPU needs to be invoked only once. Based on a constructed real data test set, duration for the input image in the current solution is effectively reduced compared with that in an original solution. In text content detection, input text line images are adjusted in a size and directly sent to a recognition model for a recognition operation. Compared with a solution in which a mechanism of a sliding window with a step of 8 and a size of 32×32 used in recognizing a typical text line of a book, the solution in this embodiment of this application used in recognizing text lines of a same specification greatly reduces duration.

DESCRIPTION OF EMBODIMENTS

The following describes the technical solutions in embodiments of this application with reference to accompanying drawings in the embodiments of this application. It should be noted that a terminal device in the embodiments of this application may be a mobile phone, a tablet computer, a wearable device, or the like.

The embodiments of this application are applied to the terminal device. A to-be-recognized image may be captured by using a camera on the terminal device, or may be an image obtained from a network or in another manner. Then, character recognition is performed on the to-be-recognized image, to obtain text line content in the to-be-recognized image.

Figure 1:
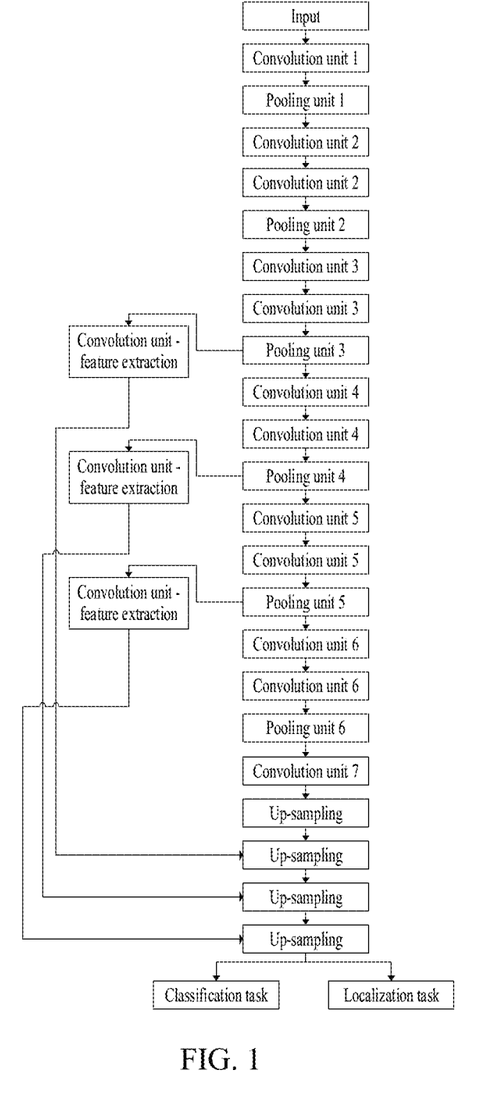
FIG. 1 is a schematic diagram of a network structure for extracting a feature by using a neural network.

FIG. 1 is a schematic diagram of a network structure for extracting a feature by using a neural network.

As shown in FIG. 1, in a phase of detecting a to-be-recognized image, a sliding window of 640×640 is used for the input to-be-recognized image, where 640×640 is a pixel ratio. The input to-be-recognized image is partitioned by using the sliding window in a manner allowing overlapping areas, to obtain a plurality of sub-images. Then, the partitioned plurality of sub-images is sent to the neural network for learning. On a feature map with a height of 160 and a width of 160, each pixel is returned to four corners of a border of a text area, and each pixel is judged to determine whether the current pixel is in the text area. Finally, text area detection on the to-be-recognized image is completed.

FIG. 1 shows the diagram of the network structure. A plurality of convolution operations and pooling operations are performed on the input to-be-recognized image to extract image features. In FIG. 1, down-sampling with a step of 2 is performed by using pooling units. Then, in down-sampling processes of a pooling unit 3, a pooling unit 4, and a pooling unit 5, the feature map layer of a specific size is extracted. Splicing is performed in up-sampling processes of a second half part in the network structure. Splicing a multi-scale feature map layer ensures that the neural network balances between local significant features in the input to-be-recognized image and regional features of a comparatively large area. However, this solution still has a plurality of problems. The sliding window is used to partition the to-be-recognized image. Therefore, an NPU needs to be invoked for a plurality of times for the plurality of sub-images. A manner in which the NPU model is invoked for the plurality of times or a plurality of batches (batch) is used. As a result, NPU parallel acceleration capabilities are not fully utilized, and duration is long. In addition, a processing solution in the plurality of batches is limited by a current NPU restriction that an input size needs to be fixed. A batch needs to be determined when a model is preset. Consequently, large calculation overheads are required in image processing. In this solution, the input to-be-recognized image is partitioned by using the sliding window in the manner allowing the overlapping areas. The overlapping areas cause comparatively large resource waste in an actual operation. In addition, because the plurality of sub-images is obtained through the partitioning, when a text area is finally post-processed and the sub-images are merged, a post-processing mechanism requires an additional layer to process merging between the sub-images due to a multi-word diagram. Therefore, extra calculation overheads are caused. If resolution of the input to-be-recognized image is very high, this inevitably causes a longer calculation time for processing, and affects use.

Figure 2:
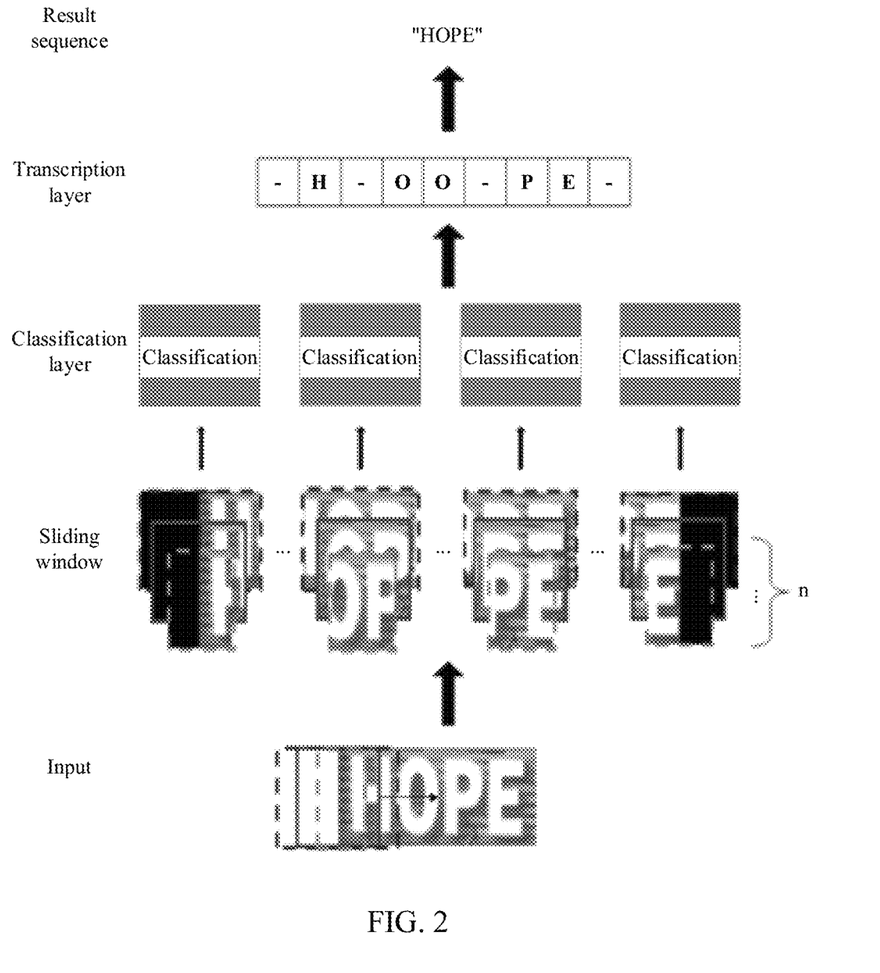
FIG. 2 is a schematic diagram of a character recognition method.

FIG. 2 is a schematic diagram of a character recognition method.

In a phase of recognizing a to-be-recognized image, an input text line image is uniformly normalized to a height of 32 pixels. A width of the text line image is proportionally adjusted based on a length-to-width ratio of the original text line image. Then, the text line image is sequentially slid by using a sliding window of 32×32 to select a plurality of text areas. The text areas are sent to a neural network for text content recognition. In this solution, sliding steps of the sliding window are set to 4 and 8 based on different languages. The sliding step of 4 is used when a height of a single character is greater than a width in languages such as English. The sliding step of 8 is used when a length-to-width ratio of a single Chinese character is 1. In order to not miss an edge text in a width direction, the sliding window performs filling at an edge of the image. As shown in FIG. 2, an input original text line image includes a text "HOPE". After the text line image is partitioned for a plurality of times through sliding in the sliding window, the sliding window simultaneously fills an edge part of each image. Then, the images are separately sent to a classification layer of the neural network for classification. A transcription layer combines classification results on the classification layer in sequence and outputs a final result "HOPE". The network input is a partitioned array of N×32×32, where N indicates a quantity of sliding windows, and 32×32 indicates image content included in each sliding window. Network output in this solution is 37 or 7357, respectively corresponding to a quantity of characters that can be processed by an English recognition model and a quantity of characters that can be processed by a Chinese recognition model. In a training process, a neural network-based time sequence classification (e.g., connectionist temporal classification (CTC)) is used as a loss function. The loss function has a capability of processing sequence context-related information, and is used to guide training of text line sequence recognition herein.

However, this solution still has several problems. First, the sliding window with a width of 32 is used on a raw image layer, and a step is set to 4 or 8. Therefore, 8 or 4 times of repeated calculation may be caused based on a calculation amount of sending the image to the neural network for recognition. As a result, when calculation is performed on a terminal device, an operation needs to be performed repeatedly and a neural network chip NPU needs to be invoked for a plurality of times. Second, the raw image layer is truncated by using the sliding window, all images that are partitioned by using the sliding window and that are in one image are spliced, and then losses (loss) of an input sequence and a sample gt sequence are calculated by using CTC, and therefore the CTC does not work. Finally, because a sliding window operation needs to be performed on each text line in an image, the NPU at each moment can process only one line of text at a time, a parallel capability between text lines is poor, and the NPU needs to be invoked for the plurality of times for processing.

In the foregoing solutions in FIG. 1 and FIG. 2, an image is partitioned by using a sliding window in a phase of recognizing different characters. As a result, a subsequent calculation amount is increased and this is time-consuming. In addition, an NPU is invoked for a plurality of times, and this requires increases calculation overheads and reduces usage efficiency. For the problems in the foregoing solutions, embodiments of this application provide a text recognition method, to effectively reduce duration of character recognition. In addition, an NPU does not need to be invoked for a plurality of times.

The following describes the technical solutions in the embodiments of the present application with reference to the accompanying drawings in the embodiments of the present application.

Figure 3:
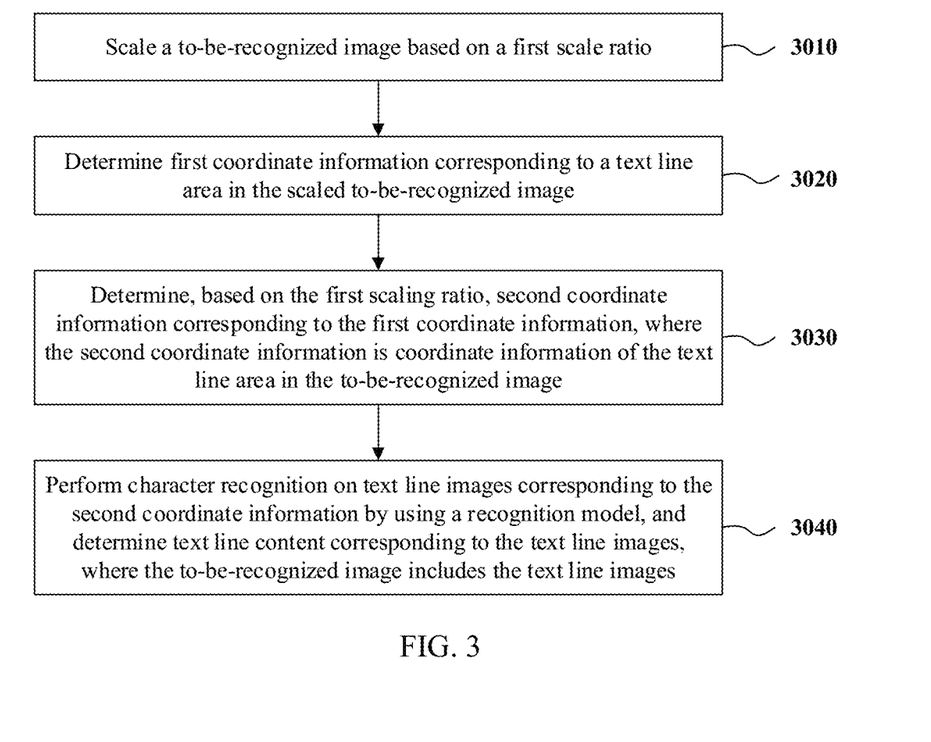
FIG. 3 is a flowchart of a text recognition method according to an embodiment of this application.

FIG. 3 is a flowchart of a text recognition method according to an embodiment of this application.

As shown in FIG. 3, the text recognition method is provided. The method includes the following steps.

Step 3010: Scale a to-be-recognized image based on a first scale ratio.

An input to-be-recognized image is scaled based on the first scale ratio. The to-be-recognized image is scaled up or scaled down based on the first scale ratio. A text line area in the input to-be-recognized image may be detected at a time by using the scaling. There is no need to partition the comparatively large to-be-recognized image into a plurality of small sub-images by using a sliding window to perform detection one by one. In an embodiment, the first scale ratio may be 960×960. In addition, a length scale ratio and a width scale ratio may be recorded separately, for example, the length scale ratio sh and the width scale ratio sw.

Step 3020: Determine first coordinate information corresponding to the text line area in the scaled to-be-recognized image.

The scaled to-be-recognized image is detected to find area coordinates corresponding to all the text line areas. There can be one or more text line areas. A person skilled in the art should note that the first coordinate information generally indicates coordinate information of the text line area in the scaled to-be-recognized image, and does not specifically indicate coordinate information corresponding to a text line area.

Step 3030: Determine, based on the first scale ratio, second coordinate information corresponding to the first coordinate information, where the second coordinate information is coordinate information of the text line area in the to-be-recognized image.

After the scaled to-be-recognized image is detected to obtain the coordinates of all the text line areas, the coordinate information is restored, based on the first scale ratio, to the corresponding coordinate information in the raw to-be-recognized image, to complete the text line area detection in the to-be-recognized image. In an example, the coordinate information of the corresponding text line area in the raw to-be-recognized image is calculated based on the scale ratios sh and sw that are previously recorded during the scaling. Corresponding text line images in the to-be-recognized image are obtained by using the coordinate information of the corresponding text line area in the raw to-be-recognized image. Scaling the to-be-recognized image can avoid a case in which the to-be-recognized image is partitioned into the plurality of sub-images by using the sliding window. An NPU only needs to be invoked once. Therefore, a limitation problem of invoking the NPU for a plurality of times is resolved. Extra calculation overheads caused by overlapping areas between the sub-images and a combination mechanism during post-processing are reduced. Therefore, an efficiency bottleneck problem is resolved.

Step 3040: Perform character recognition on text line images corresponding to the second coordinate information by using a recognition model, and determine text line content corresponding to the text line images, where the to-be-recognized image includes the text line images.

In an embodiment, the text line images corresponding to the second coordinate information may be adjusted based on a second pixel ratio, and the character recognition is performed on the adjusted text line images. Adjustment manners may include proportional scaling, equal width scaling, equal length scaling, tile scaling, zero filling scaling, and the like. A person skilled in the art should note that the adjustment manners are not limited to the foregoing mentioned manners, and may further include any equivalent adjustment manner.

In an embodiment, in a phase of constructing the recognition model, an operator in the model does not include a sliding window and a recurrent neural network operator layer that are outside a convolution operation. Therefore, it can be ensured that a processing time of the model on an AI chip of a terminal device is short and efficient. A processing advantage of the AI chip in the terminal device can be utilized fully, and no additional CPU operation or data transmission between a CPU and an NPU is required.

The recognition model in this embodiment of this application may be a fully convolutional network model. A parameter output by the fully convolutional network model may be [batch_num, word_num, 1, channel]. batch_num indicates a quantity of samples processed in a batch. If a plurality of lines of text line images need to be processed concurrently, a value of batch_num is greater than 1. word_num indicates a quantity of different characters in a language. channel indicates a quantity of channels. It is assumed that a size of a character is an area of A×A. If a text line is in a dimension of A×H and it is assumed that an average spacing between characters is a stride, a quantity of channels is (H−A)/Stride+1.

Then, the text line images are input into the fully convolutional network model for processing, to obtain a return result. During processing by the terminal device, all operations of the fully convolutional network model are completed in the AI chip. When the fully convolutional network model is constructed, a CTC loss layer needs to be added after a network output layer, so that a network weight is learned by using a maximum likelihood algorithm. In a prediction phase, an output result predicted by the fully convolutional network model is input to a CTC beam search to obtain an optimal result in a cluster.

The recognition model in this embodiment of this application resolves a problem of repeated calculation caused by sliding by using a sliding window on a raw image layer, and further resolves a limitation problem that a sequence target and a learning target cannot be used to combine context information on the network structure due to a CTC mechanism. In addition, the recognition model can further be used to concurrently process text lines, to eliminate limitation on an input width and redundant calculation in the network structure, and improve NPU usage.

This embodiment of this application provides, for the first time, a single-scale restoration detection method on the terminal device, to complete a high-resolution text line detection task frequently occurring on the terminal device. The text line area is detected by scaling the to-be-recognized image, and the sliding window and the multi-scale calculation are not required. In addition, a high-resolution image can be processed once and the NPU is invoked only once. A restoration mechanism is used and the first scale ratio is retained. After a text position is detected, coordinate information is restored to the raw to-be-recognized image with the high resolution. This effectively ensures high precision of a recognized part, greatly optimizes a prediction speed of the model on a terminal side, and improves the NPU usage.

Figure 4:
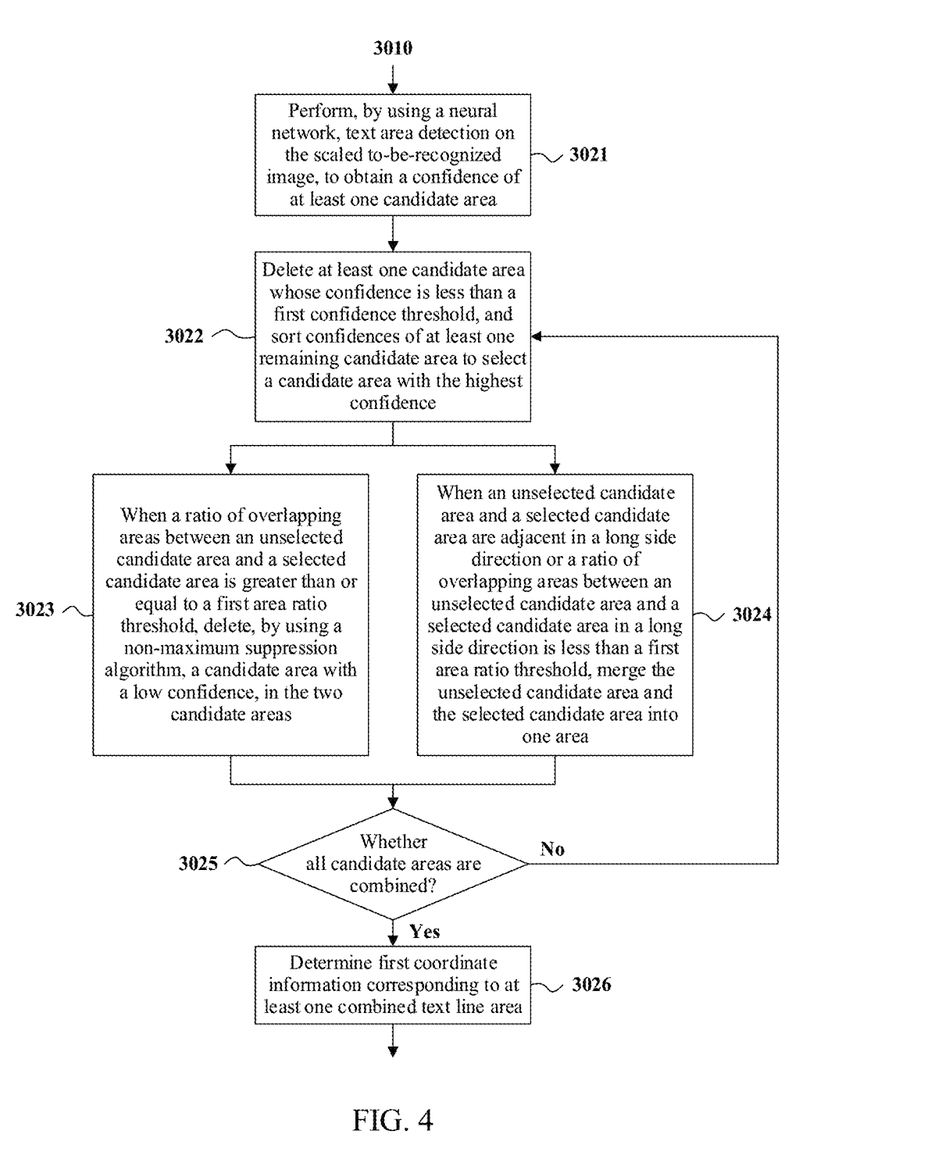
FIG. 4 is a flowchart of another text recognition method according to an embodiment of this application.

FIG. 4 is a flowchart of another text recognition method according to an embodiment of this application.

As shown in FIG. 4, a comparatively specific procedure for determining first coordinate information is provided. After the step 3010, the method further includes the following steps. Step 3021: Perform, by using a neural network, text area detection on the scaled to-be-recognized image, to obtain a confidence of at least one candidate area.

In an example, the neural network may be a text area detection neural network. The neural network uses the image as input, and corner points of a text box area in the image is used as output. The text box area may be in a convex quadrilateral form. The text area detection neural network extracts a feature of the scaled to-be-recognized image and detects the corner points of the text area. In the text area detection neural network, feature map layers are extracted from feature map layers whose scale sizes are ¼ and ⅛ by using a fully connected layer. The feature map layers are spliced back into a network backbone structure by using an elastic layer (eltwise) operator at two subsequent deconvolution layers. The feature map layers whose scale sizes are ¼ and ⅛ can ensure the text area detection neural network to detect texts of a comparatively small size and a medium size. A feature map layer whose scale size is 1/16 in the network backbone can ensure that the text area detection neural network detects a text of a comparatively large size. A classification task and a regression task can further be executed on a spliced feature map layer. The classification task is used to determine whether the area in the raw to-be-recognized image mapped by the feature map layer is the text area. The regression task is used to determine four corners of a text boundary of the area in the raw to-be-recognized image mapped by the feature map layer. In addition, the confidence of the area is calculated for the detected at least one candidate area. The confidence is a value of a probability that the at least one candidate area includes a text line.

In this embodiment of this application, an NPU needs to be invoked only once in this step. The text area detection neural network is used to perform the text area detection on the scaled to-be-recognized image.

Step 3022: Delete at least one candidate area whose confidence is less than a first confidence threshold, and sort confidences of at least one remaining candidate area to select the candidate area with the highest confidence.

A confidence of one or more candidate areas is obtained, and then the at least one candidate area whose confidence is less than the first confidence threshold is selected, to delete the area with a low confidence and reduce subsequent calculation loads. Then, a confidence of one or more remaining candidate areas is sorted to select the candidate area with the highest confidence.

Step 3023: When a ratio of overlapping areas between an unselected candidate area and a selected candidate area is greater than a first area ratio threshold, delete, by using a non-maximum suppression algorithm, a candidate area with a low confidence, in the two candidate areas.

In an example, the ratio of the area may be a decimal fraction, a percentage value, or the like. For example, the ratio of the area may be 0.8, 80%, or the like.

Step 3024: When an unselected candidate area and a selected candidate area are adjacent in a long side direction or a ratio of overlapping areas between the unselected candidate area and the selected candidate area in a long side direction is less than the first area ratio threshold, merge the unselected candidate area and the selected candidate area into one area.

The unselected candidate area and the selected candidate area are combined. In an embodiment, an operation may be suppression or fusion. The suppression may be non-maximum suppression (NMS). The ratio of the overlapping areas between the unselected candidate area and the selected candidate area is compared with the first area ratio threshold. When there is a large overlapping area between the selected candidate area and the unselected candidate area, a text line area with a comparatively low confidence is suppressed. In other words, the text line area with a low confidence is deleted. In an example, a first area ratio threshold may be set. When a ratio of overlapping areas is greater than or equal to the first area ratio threshold, a text line area with a comparatively low confidence is suppressed.

However, when the ratio of overlapping areas in edge areas between the selected candidate area and the unselected candidate area in a long side direction is less than the first area ratio threshold or the selected candidate area and the unselected candidate area have adjacent edges in a long side direction, the two candidate areas are fused, and are combined into one area. In an example, whether slopes of the selected candidate area and the unselected candidate area are the same may be further determined. If the slopes are the same, it may be determined that the selected candidate area and the unselected candidate area are in a same text line.

Step 3025: Determine whether all candidate areas are combined. In other words, whether the suppression or the fusion is performed on all the candidate areas is determined. When there are still candidate areas that are not suppressed or fused, the step 3022 continues to be performed. A confidence of the remaining candidate areas that are not suppressed or fused is sorted to select a candidate area with the highest confidence to continue to be suppressed or fused with the unselected candidate area, until all the candidate areas are combined.

Step 3026: Determine first coordinate information corresponding to at least one combined text line area.

The candidate areas are combined, namely, suppressed and fused to finally obtain area coordinate information of one or more combined text line areas, and perfectly select each text line from the to-be-recognized image. In an example, one or more text lines do not overlap with each other and are independent of each other.

In an example, text area detection is performed on a scaled to-be-recognized image. An artificial neural network dedicated processing chip NPU calculation unit is used to calculate coordinate information corresponding to a text line area. Then, one or more text line areas are screened by using a preset first confidence threshold, to screen out a text line area with a high confidence. Then, suppression is performed based on overlapping areas of different text line areas, some overlapping text line areas with a comparatively low confidence are removed, and adjacent text line areas are fused, to finally obtain one or more comparatively independent text line areas.

Figure 5:
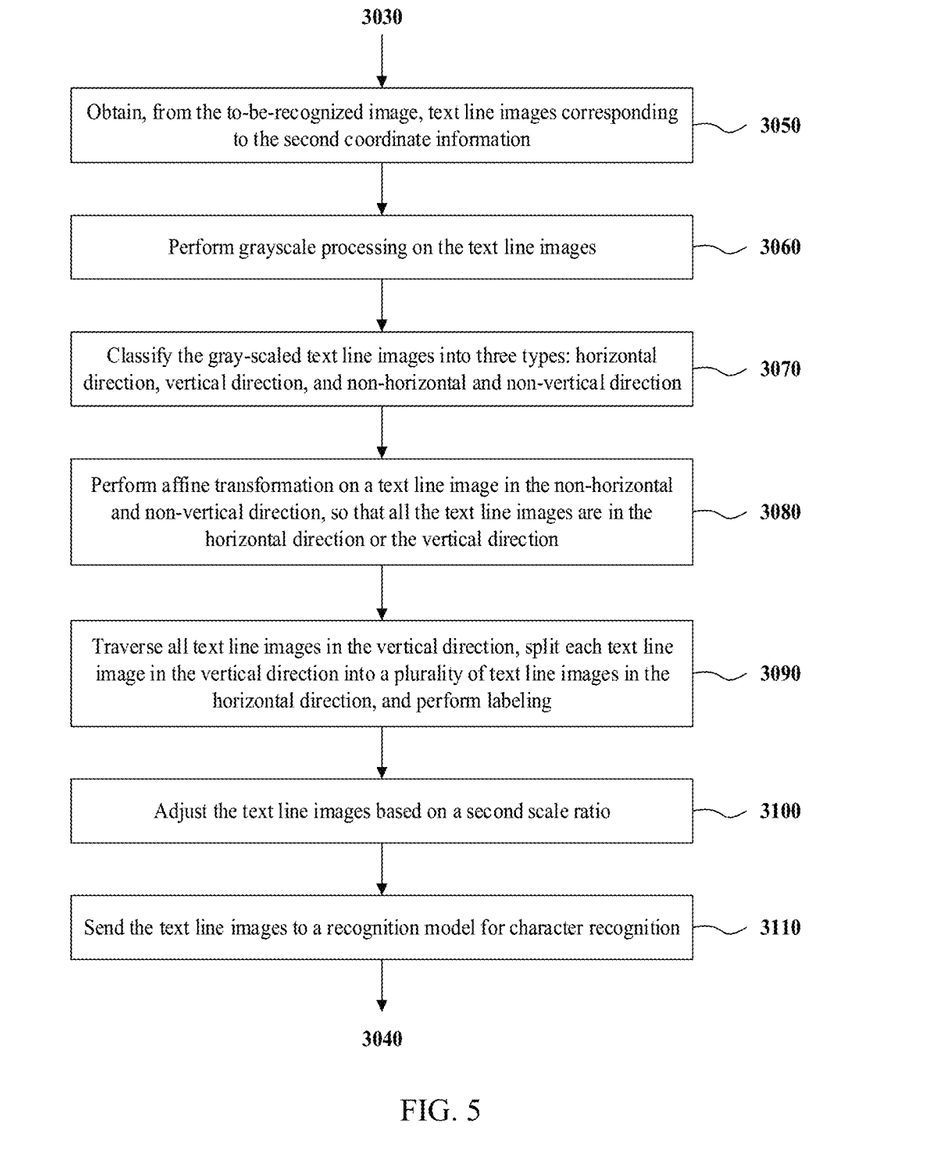
FIG. 5 is a flowchart of a still another text recognition method according to an embodiment of this application.

FIG. 5 is a flowchart of a still another text recognition method according to an embodiment of this application.

Before the step 3040 of performing character recognition on text line images corresponding to the second coordinate information by using a recognition model in FIG. 3, as shown in FIG. 5, the method further includes the following steps.

Step 3050: Obtain, from the to-be-recognized image, the text line images corresponding to the second coordinate information.

The text line images of the corresponding text line area are selected from the raw to-be-recognized image by using the second coordinate information.

Step 3060: Perform grayscale processing on the text line images. The grayscale processing is processed on the text line images. Data information about the text line images can be effectively reduced, and a subsequent calculation amount of the text line images can be reduced.

Step 3070: Classify the gray-scaled text line images into three types: horizontal direction, vertical direction, and non-horizontal and non-vertical direction.

The classification is performed on the gray-scaled text line images. All the text line images are classified into the three types: the horizontal direction, the vertical direction, and the non-horizontal and non-vertical direction.

Step 3080: Perform affine transformation on a text line image in the non-horizontal and non-vertical direction, so that all the text line images are in the horizontal direction or the vertical direction.

Corresponding functions are preset in different directions. The affine transformation is performed on the text line image in the non-horizontal and non-vertical direction. The text line image in the non-horizontal and non-vertical direction is mapped to the horizontal direction or the vertical direction. In an example, a tilt angle between a horizontal direction and a text line image in a non-horizontal and non-vertical direction is determined. If the tilt angle is greater than an included angle threshold, the text line image in the non-horizontal and non-vertical direction is mapped to a vertical direction. Otherwise, the text line image in the non-horizontal and non-vertical direction is mapped to the horizontal direction.

Step 3090: Traverse all text line images in the vertical direction, split each text line image in the vertical direction into a plurality of text line images in the horizontal direction, and perform labeling.

Because chips in most current terminal devices have limitations on a framework, a network input dimension cannot be adapted in a running state. Therefore, if a horizontal text and a vertical text are to be processed, two network models with different input dimensions usually need to be preset for processing. This greatly increases read-only memory (ROM) space overheads in the terminal devices. Therefore, in this embodiment of this application, the text line in the vertical direction is regulated to a text line in the horizontal direction for recognition.

For all the text line images in the vertical direction, a horizontal labeling manner is used for each character. The text line images in the vertical direction are split into a plurality of single-character text line images in the horizontal direction, and each split single-character text line image in the horizontal direction is labeled.

In the foregoing method, all the text line images in the vertical direction are transformed into the plurality of text line images in the horizontal direction, to reduce ROM space overheads in the terminal devices.

Step 3100: Adjust the text line images based on a second pixel ratio.

To facilitate subsequent recognition of the text line images, pixel ratios of all the text line images may be uniformly adjusted to the second pixel ratio. In an example, pixel ratios of all the text line images may be adjusted to an aspect ratio size 32×512. If a width of an original text line image is not long enough, 0 can be filled.

Step 3110: Send the text line images to a recognition model for character recognition.

In an example, grayscale processing is performed on all the text line images, to reduce a data amount of the images. Affine transformation is performed on a gray-scaled text line image in a non-horizontal and non-vertical direction, to obtain a gray-scaled text line image in a vertical direction or a horizontal direction. Then, a text line image in the vertical direction is split to obtain a plurality of text line images in the horizontal direction. In this case, all the text line images are in the horizontal direction. To ensure that a text area is recognized more quickly in a recognition model, all the text line images in the horizontal direction may be uniformly adjusted to an aspect ratio size 32×512. If a length is not long enough, 0 may be filled at an edge.

In the foregoing method, the text line images in the vertical direction may be transformed into the text line images in the horizontal direction to greatly reduce the overheads of the ROM space in the terminal devices.

Figure 6:
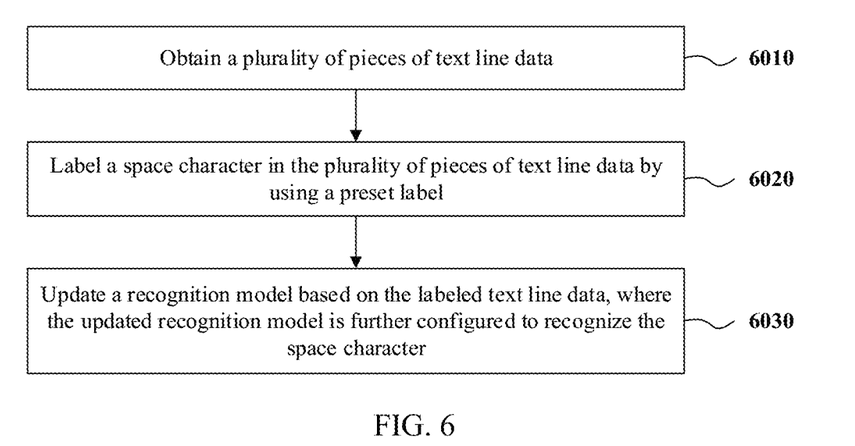
FIG. 6 is a flowchart of yet another text recognition method according to an embodiment of this application.

FIG. 6 is a flowchart of yet another text recognition method according to an embodiment of this application.

When Chinese characters and English characters are mixed, because a space between the Chinese characters is naturally narrower than a space between the English characters, a space problem is particularly prominent. A spacing between spaces varies in different fonts. The space does not appear in a font library. In a solution, some images are partitioned by a word partition model, some images are based on a char-based recognition model, and some images have no space in each line of text in labeling.

As shown in FIG. 6, a recognition model in this embodiment of this application may also be used to recognize the space. In a phase of training the recognition model, the following steps may be performed to enhance sensitivity of the recognition model for space recognition. The following steps are included.

Step 6010: Obtain a plurality of pieces of text line data.

In the phase of training the recognition model, a large quantity of text line data is required to train the model. The plurality of pieces of text line data are obtained, so that the model can be fully trained and learned.

Step 6020: Label a space character in the plurality of pieces of text line data by using a preset label.

When the plurality of pieces of text line data are labeled, the space character is labeled by using the preset label. The preset label indicates a space type.

Step 6030: Update the recognition model based on the labeled text line data, where the updated recognition model is further configured to recognize the space character.

In the phase of training the recognition model, a CTC loss layer is used for continuous learning. In a model weight, the recognition model is more sensitive to the space character. Therefore, the space character can be correctly recognized in subsequent recognition model use.

This embodiment of this application provides a solution for the first time that the CTC loss is directly used to resolve the space recognition problem in Chinese-English mixed text line detection. In the foregoing mechanism, a maximum performance advantage of an NPU chip on a terminal device can be fully utilized in an OCR task.

Figure 7:
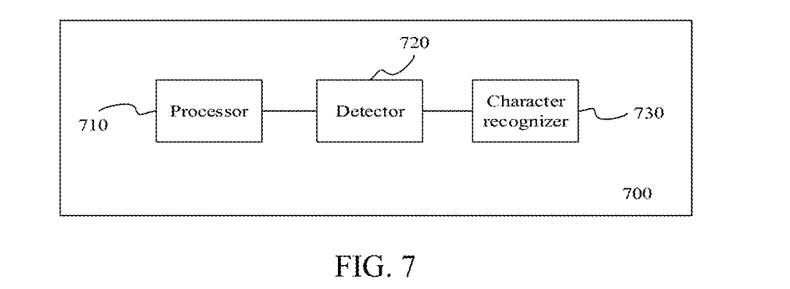
FIG. 7 is a schematic diagram of a terminal for text recognition according to an embodiment of this application.

FIG. 7 is a schematic diagram of a terminal for text recognition according to an embodiment of this application.

As shown in FIG. 7, this embodiment of this application further provides a terminal device 700. The terminal device includes a processor 710, a detector 720, and a character recognizer 730.

The processor 710 is configured to scale a to-be-recognized image based on a first scale ratio.

The detector 720 is configured to determine first coordinate information corresponding to a text line area in the scaled to-be-recognized image; and determine, based on the first scale ratio, second coordinate information corresponding to the first coordinate information, where the second coordinate information is coordinate information of the text line area in the to-be-recognized image.

The character recognizer 730 is configured to perform character recognition on text line images corresponding to the second coordinate information by using a recognition model; and determine text line content corresponding to the text line images, where the to-be-recognized image includes the text line images.

In an example, the to-be-recognized image includes at least one text line area. The detector 720 is further configured to: perform, by using a neural network, text area detection on the scaled to-be-recognized image, to obtain a confidence of at least one candidate area, where the confidence is a value of a probability that the at least one candidate area includes a text line; and delete at least one candidate area whose confidence is less than a first confidence threshold, sort confidences of at least one remaining candidate area to select the candidate area with the highest confidence, combine the selected candidate area and an unselected candidate area, sort confidences of the uncombined at least one candidate area to select the candidate area with the highest confidence, combine the selected candidate area and an unselected candidate area, and determine the first coordinate information corresponding to at least one combined text line area until all candidate areas are combined.

In an example, that the selected candidate area and the unselected candidate area are combined includes: when a ratio of overlapping areas between the unselected candidate area and the selected candidate area is greater than or equal to a first area ratio threshold, a text line area with a low confidence, in the two candidate areas is deleted by using a non-maximum suppression algorithm; and when the unselected candidate area and the selected candidate area are adjacent in a long side direction or a ratio of overlapping areas between the unselected candidate area and the selected candidate area in a long side direction is less than the first area ratio threshold, the unselected candidate area and the selected candidate area are merged into one area.

In an example, the detector 720 is further configured to obtain, from the to-be-recognized image, the text line images corresponding to the second coordinate information; perform grayscale processing on the text line images; and send the gray-scaled text line images to the character recognizer for the character recognition.

In an example, before the character recognition is performed on the gray-scaled text line images by using a recognition model, the detector 720 is further configured to: classify the gray-scaled text line images into three types: horizontal direction, vertical direction, and non-horizontal and non-vertical direction; perform affine transformation on a text line image in the non-horizontal and non-vertical direction, so that all text line images are in the horizontal direction or the vertical direction; and traverse all text line images in the vertical direction, split each text line image in the vertical direction into a plurality of text line images in the horizontal direction, and perform labeling.

In an example, that each text line image in the vertical direction is split into the plurality of text line images in the horizontal direction, and the labeling is performed includes: in a horizontal labeling manner, each text line image in the vertical direction is split into the plurality of single-character text line images in the horizontal direction and the labeling is performed.

In an example, the detector 720 is further configured to scale, based on a second scale ratio, the text line images corresponding to the second coordinate information, and perform the character recognition on the scaled text line images.

In an example, manners for scaling the text line images to a second pixel ratio include: proportional scaling, equal width scaling, equal length scaling, tile scaling, and zero filling scaling.

In an example, the recognition model is further configured to recognize a space character.

In an example, an operator in the recognition model does not include a sliding window and a recurrent neural network operator layer that are outside a convolution operation.

Figure 8:
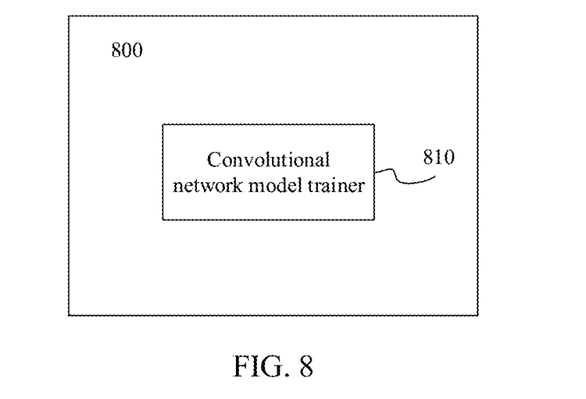
FIG. 8 is a schematic diagram of another terminal for text recognition according to an embodiment of this application.

FIG. 8 is a schematic diagram of another terminal for text recognition according to an embodiment of this application.

As shown in FIG. 8, this embodiment of this application further provides a terminal device 800 including a convolutional network model trainer 810.

The convolutional network model trainer 810 is configured to obtain a plurality of pieces of text line data; label a space character in the plurality of pieces of text line data by using a preset label; and update a recognition model based on labeled text line data. The updated recognition model is further configured to recognize a space character.

In text area detection in this embodiment of this application, after an input image is scaled to 960×960, the input image is sent to a text area model for detection. In the solution of this embodiment of this application, an NPU needs to be invoked only once. In an actual data test set, the solution in this embodiment of this application, one input image takes about 280 milliseconds (ms). The time is effectively reduced compared with about 920 ms in a solution. However, in text content detection in this embodiment of this application, an input text line image is directly sent to the recognition model for a recognition operation after being adjusted a size of the input text line image. Compared with a solution in which a mechanism of a sliding window with a step of 8 and a size of 32×32 consumes about 120 ms in recognizing a typical text line of a book, the solution in this embodiment of this application consumes only about 35 ms in recognizing text lines of a same specification. It can be learned that the solution in this embodiment of this application can effectively improve a recognition speed.

A person skilled in the art should be aware that in the foregoing one or more examples, functions described in the embodiments of this application may be implemented by hardware, software, firmware, or any combination thereof. When the functions described in the embodiments of this application are implemented by software, the foregoing functions may be stored in a computer-readable medium or transmitted as one or more instructions or code in a computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

Steps of methods or algorithms described in the embodiments disclosed with reference to this specification may be implemented by hardware, a software module executed by a processor, or a combination thereof. The software module may be configured in a random access memory (RAM), a memory, a ROM, an electrically programmable ROM, an electrically erasable programmable ROM, a register, a hard disk, a removable disk, a compact disc read-only memory (CD-ROM), or a storage medium in any other forms.

The objectives, technical solutions, and benefits of this application are further described in detail in the foregoing specific embodiments. It should be understood that the foregoing descriptions are merely specific implementations of this application, but are not intended to limit the protection scope of this application. Any modification, equivalent replacement or improvement made based on technical solutions of this application shall fall within the protection scope of this application.

What is claimed is:

1. A text recognition method, comprising:
   scaling, based on a first scaling ratio, a to-be-recognized image to produce a scaled to-be-recognized image, wherein the to-be-recognized image comprises text line images;
   determining first coordinate information corresponding to a first text line area in the scaled to-be-recognized image by:
      performing, using a neural network, text area detection on the scaled to-be-recognized image to obtain confidences of candidate areas, wherein the confidence for each of the candidate areas is a value of a probability that the candidate area comprises a text line;
      deleting a first candidate area having a confidence less than a first confidence threshold;
      sorting confidences of at least one remaining candidate area to select a second candidate area having a highest confidence in the at least one remaining candidate area;
      combining the second candidate area and a first unselected candidate area to produce a first combined area;
      sorting confidences of uncombined candidate areas to select a third candidate area having a highest confidence in the uncombined candidate areas; and
      combining the third candidate area and a second unselected candidate area to produce a second combined area, wherein the first coordinate information corresponds to at least one of the first combined area or the second combined area until all candidate areas are combined, and wherein second coordinate information corresponds to a second text line area in the to-be-recognized image and is based on the first scaling ratio and the first coordinate information;
   performing, using a recognition model and the second coordinate information, character recognition on the text line images in the second text line area; and
   determining text line content corresponding to the text line images.

2. The text recognition method of claim 1, wherein the to-be-recognized image comprises at least one text line area.

3. The text recognition method of claim 1, further comprising:

deleting, using a non-maximum suppression algorithm, a candidate area in the first combined area or the second combined area with a low confidence when a ratio of overlapping areas between the second candidate area and the first unselected candidate area or the third candidate area and the second unselected candidate area is greater than or equal to a first area ratio threshold; and merging candidate areas in the first combined area of the second combined area into one area when the second candidate area and the first unselected candidate area or the third candidate area and the second unselected candidate area are adjacent in a long side direction or the ratio of overlapping areas between the second candidate area and the first unselected candidate area or the third candidate area and the second candidate area in the long side direction is less than the first area ratio threshold.

4. The text recognition method of claim 1, wherein before performing, using the recognition model and the second coordinate information, the character recognition on the text line images in the second text line area, the text recognition method further comprises:

obtaining, from the to-be-recognized image, the text line images corresponding to the second coordinate information;

performing grayscale processing on the text line images to produce grayscaled text line images; and sending the grayscaled text line images to the recognition model for the character recognition.

5. The text recognition method of claim 4, wherein before performing the grayscale processing on the text line images to produce the grayscaled text line images, the text recognition method further comprises:

classifying the grayscaled text line images into three types, wherein the three types comprise a horizontal direction type, a vertical direction type, and a non-horizontal and non-vertical direction type;

performing affine transformation on the grayscaled text line images having the non-horizontal and non-vertical direction type to transform all text line images into a horizontal direction or a vertical direction;

traversing the grayscaled text line images having the vertical direction type to produce text line images in the vertical direction;

splitting each text line image in the vertical direction into a plurality of text line images in the horizontal direction; and performing labeling on the text line images in the horizontal direction.

6. The text recognition method of claim 5, further comprising:

splitting each text line image in the vertical direction into a plurality of single-character text line images in the horizontal direction; and performing labeling on the single-character text line images.

7. The text recognition method of claim 1, further comprising:

scaling, based on a second scaling ratio, the text line images corresponding to the second coordinate information to produce scaled text line images; and performing the character recognition on the scaled text line images.

8. The text recognition method of claim 7, further comprising scaling the text line images corresponding to the second coordinate information using proportional scaling, equal width scaling, equal length scaling, tile scaling, or zero filling scaling.

9. The text recognition method of claim 1, further comprising recognizing, using the recognition model, a space character.

10. The text recognition method of claim 9, further comprising recognizing, using the recognition model, a type of the space character.

11. A terminal device, comprising:
a memory configured to store computer-executable instructions; and
a processor coupled to the memory and configured to execute the instructions to cause the terminal device to be configured to:
scale a to-be-recognized image based on a first scaling ratio to produce a scaled to-be-recognized image, wherein the to-be-recognized image comprises text line images;
determine first coordinate information corresponding to a first text line area in the scaled to-be-recognized image, wherein to determine the first coordinate information, the processor is further configured to execute the instructions to cause the terminal device to be configured to:
perform, using a neural network, text area detection on the scaled to-be-recognized image to obtain confidences of candidate areas, wherein the confidence of each of the candidate areas is a value of a probability that the candidate area comprises a text line;
delete a first candidate area having a confidence less than a first confidence threshold;
sort confidences of at least one remaining candidate area to select a second candidate area having a highest confidence in the at least one remaining candidate area;
combine the second candidate area and a first unselected candidate area to produce a first combined area;
sort confidences of uncombined candidate areas to select a third candidate area having a highest confidence in the uncombined candidate areas; and
combine the third candidate area and a second unselected candidate area to produce a second combined area, wherein the first coordinate information corresponds to at least one of the first combined area or the second combined area until all candidate areas are combined, and wherein second coordinate information corresponds to a second text line area in the to-be-recognized image and is based on the first scaling ratio and the first coordinate information;
perform, using a recognition model, character recognition on the text line images in the second text line area; and
determine text line content corresponding to the text line images.

12. The terminal device of claim 11, wherein the to-be-recognized image comprises at least one text line area.

13. The terminal device of claim 11, wherein the processor is further configured to execute the instructions to cause the terminal device to be configured to:

delete, using a non-maximum suppression algorithm, a candidate area in the first combined area or the second combined area with a low confidence when a ratio of overlapping areas between the second candidate area and the first unselected candidate area or the third candidate area and the second unselected candidate area is greater than or equal to a first area ratio threshold; and merge candidate areas in the first combined area of the second combined area into one area when the second candidate area and the first unselected candidate area or the third candidate area and the second unselected candidate area are adjacent in a long side direction or the ratio of overlapping areas between the second candidate area and the first unselected candidate area or the third candidate area and the second candidate area in the long side direction is less than the first area ratio threshold.

14. The terminal device of claim 11, wherein the processor is further configured to execute the instructions to cause the terminal device to be configured to:

obtain, from the to-be-recognized image, the text line images corresponding to the second coordinate information;

perform grayscale processing on the text line images to produce grayscaled text line images; and perform, using the recognition model, character recognition on the grayscaled text line images.

15. The terminal device of claim 14, wherein before performing, using the recognition model, the character recognition on the grayscaled text line images, the processor is further configured to execute the instructions to cause the terminal device to be configured to:

classify the grayscaled text line images into three types, wherein the three types comprise a horizontal direction type, a vertical direction type, and a non-horizontal and non-vertical direction type;

perform affine transformation on the grayscaled text line images having the non-horizontal and non-vertical direction type to transform all text line images into a horizontal direction or a vertical direction;

traverse the grayscaled text line images having the vertical direction type to produce text line images in the vertical direction;

split each text line image in the vertical direction into a plurality of text line images in the horizontal direction; and perform labeling on the text line images in the horizontal direction.

16. The terminal device of claim 15, wherein the processor is further configured to execute the instructions to cause the terminal device to be configured to:

split each text line image in the vertical direction into a plurality of single-character text line images in the horizontal direction; and perform labeling on the single-character text line images.

17. The terminal device of claim 11, wherein the processor is further configured to execute the instructions to cause the terminal device to be configured to:

scale, based on a second scaling ratio, the text line images corresponding to the second coordinate information to produce scaled text line images; and perform the character recognition on the scaled text line images.

18. The terminal device of claim 17, wherein the processor is further configured to execute the instructions to cause the terminal device to scale the text line images corresponding to the second coordinate information using proportional scaling, equal width scaling, equal length scaling, tile scaling, or zero filling scaling.

19. The terminal device of claim 11, wherein the processor is further configured to execute the instructions to cause the terminal device to recognize a space character.

20. The terminal device of claim 19, wherein the processor is further configured to execute the instructions to cause the terminal device to recognize a type of the space character.

* * * * *